(12) United States Patent
Sawada et al.

(10) Patent No.: US 7,098,250 B2
(45) Date of Patent: Aug. 29, 2006

(54) SURFACTANT FOR EMULSION POLYMERIZATION

(75) Inventors: Hiroki Sawada, Wakayama (JP); Yasuo Ishii, Wakayama (JP); Takayuki Ikenaga, Wakayama (JP)

(73) Assignee: Kao Corporation, Tokyo (JP)

( * ) Notice: Subject to any disclaimer, the term of this patent is extended or adjusted under 35 U.S.C. 154(b) by 351 days.

(21) Appl. No.: 10/344,851

(22) PCT Filed: Sep. 10, 2001

(86) PCT No.: PCT/JP01/07840

§ 371 (c)(1),
(2), (4) Date: Apr. 21, 2003

(87) PCT Pub. No.: WO02/22692

PCT Pub. Date: Mar. 21, 2002

(65) Prior Publication Data

US 2004/0048963 A1    Mar. 11, 2004

(30) Foreign Application Priority Data

Sep. 11, 2000  (JP)  ............... 2000-274731
Sep. 21, 2000  (JP)  ............... 2000-287431

(51) Int. Cl.
   *B01F 17/00*  (2006.01)
   *B01F 3/08*   (2006.01)
(52) U.S. Cl. .......................... 516/58; 516/75
(58) Field of Classification Search .............. 516/58
   See application file for complete search history.

(56) References Cited

U.S. PATENT DOCUMENTS 5,142,036 A * 8/1992 Akimoto et al. ........... 536/18.3
6,461,735 B1 * 10/2002 Furuya et al. ............... 428/429

FOREIGN PATENT DOCUMENTS

| JP | 59-42035     A |   | 3/1984  |
| JP | 59-81302     A |   | 5/1984  |
| JP | 61-223011    A |   | 10/1986 |
| JP | 62-68806     A |   | 3/1987  |
| JP | 62-104802    A |   | 5/1987  |
| JP | 11-29547     A |   | 2/1999  |
| JP | 2001191026   | * | 7/2001  |
| JP | 2001-240630  A |   | 9/2001  |
| JP | 2001-240633  A |   | 9/2001  |
| JP | 2002179788   | * | 6/2002  |
| WO | 89/12618     A1 |  | 12/1989 |

OTHER PUBLICATIONS

Roy et al., Macromolecules, vol. 32, pp. 5967-5969 (1999).
Patent Abstracts of Japan, Pub. No. 2001-240633 (Sep. 4, 2001).
Patent Abstracts of Japan, Publication No. 2001-240630 (Sep. 4, 2001).
Patent Abstracts of Japen, Publication No. 62-68806 (Mar. 28, 1987).
Abstract of JP 11-29547 (Feb. 2, 1999).

* cited by examiner

*Primary Examiner*—Randy Gulakowski
*Assistant Examiner*—Timothy J. Kugel
(74) *Attorney, Agent, or Firm*—Birch, Stewart, Kolasch & Birch, LLP

(57) ABSTRACT

The invention provides a surfactant for emulsion polymerization represented by the formula (I), (II) or (VI). The invention also provides a method of producing a polymer emulsion using this surfactant.

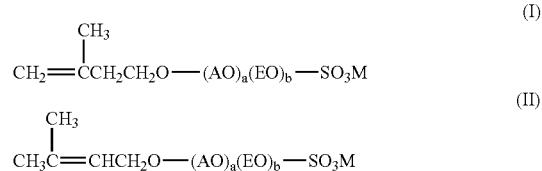

wherein A represents an alkylene group having 3 to 18 carbon atoms or an alkoxymethylethylene group (alkoxy group has 4 to 18 carbon atoms), EO represents an oxyethylene group, a denotes a number of 0 to 50, b denotes a number of 0 to 200 wherein a and b are not 0 at the same time and M represents a cation;

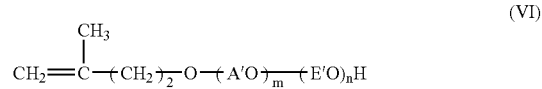

wherein A'O represents an oxyalkylene group having 3 to 18 carbon atoms, E'O represents an oxyethylene group, m denotes a number of 0 to 50 and n denotes a number of 5 to 200, provided that the -(A'O)— groups m in number [-(A'O)m-] may be the same as or different from one another.

5 Claims, No Drawings

SURFACTANT FOR EMULSION POLYMERIZATION

This application is the national phase under 35 U.S.C. § 371 of PCT International Application No. PCT/JP01/07840 which has an International filing date of Sep. 10, 2001, which designated the United States of America.

FIELD OF THE INVENTION

The present invention relates to a surfactant for emulsion polymerization, its composition and a method of producing a polymer emulsion by using the same. The present invention provides a polymer emulsion which is superior in polymerization stability, mechanical stability and chemical stability and provides a polymer film having high water resistance.

PRIOR ART

Polymer emulsions obtained by emulsion polymerization of a vinyl type monomer such as vinyl acetate and acrylate esters are widely used for industrial uses in the fields of paints, adhesives, paper-making and textile-making as they stand or as plastics and rubbers of the polymer separated therefrom.

Anionic surfactants such as alkyl sulfate salts, alkylbenzene sulfonate salts, polyoxyethylene alkyl ether sulfate salts and polyoxyethylene alkylphenyl ether sulfate salts and nonionic surfactants such as polyoxyethylene alkyl ethers and polyoxyethylene alkylphenyl ethers are used as emulsifiers for the emulsion polymerization.

The emulsifier in the emulsion polymerization not only affects an initiation reaction and propagation reaction of polymerization but also has an influence on the stability of a polymer emulsion during polymerization and further on the mechanical stability, chemical stability, freezing stability and storage stability of a produced polymer emulsion and also has a large influence on the properties of the emulsion such as particle diameter, viscosity and foaming characteristics and further on the water resistance, moisture resistance, heat resistance, adhesiveness and sticking characteristics of the polymer film when the polymer emulsion is made into the film. In paint or adhesive applications, a polymer coating film is formed by drying a polymer emulsion. In this case, it is known that an emulsifier left in the polymer coating film causes a deterioration in water resistance, adhesiveness, weatherability and heat resistance. Also, in the production of synthetic rubbers and the like, an emulsifier is contained in waste water when a polymer is isolated from a polymer emulsion by means of, for example, salting out, posing the problem of increased work load for waste water treatment.

As an emulsifier for emulsion polymerization, various surfactants are used. A surfactant which is generally called a reactive surfactant and has a radical polymerizable unsaturated bond in its molecule is proposed to improve, particularly, the water resistance and adhesiveness of a polymer film.

The reactive surfactants include anionic or nonionic surfactants. Like non-reactive surfactants, the anionic reactive surfactant is superior in polymerization stability to the nonionic reactive surfactant and is widely used in the fields requiring the water resistance of a film. Since, in the paint applications, inorganic pigments are added in a large amount, it is necessary to use a nonionic reactive surfactant to maintain the stability of an emulsion and therefore a nonionic reactive surfactant has been used singly or a mixture of an anionic surfactant and a nonionic reactive surfactant has been used.

As conventional nonionic reactive surfactants, butylene oxide or ethylene oxide adducts of allyl alcohol and ethylene oxide adducts of undecenoic acid are disclosed in JP-A 59-42035 and JP-A 59-81302. Also, a nonionic reactive surfactant produced by further adding an alkylene oxide to 1,3-di-substituted-2-propanol obtained by a reaction of a polyoxyalkylene alkyl (or alkylphenyl) ether, or an alkanol and an alkylphenol with allyl glycidyl ether is disclosed in JP-A 62-104802. However, these conventional nonionic reactive surfactants have insufficient polymerization stability and are therefore unsatisfactory.

Moreover, JP-W 3-503168 (WO-A 89-12618, EP-A 422120) discloses RO—(R'O)$_m$-(EO)$_{n-1}$—CH$_2$HCH$_2$X. X represents OH, Cl, t-amino group, sulfonic acid group (SO$_3$), sulfuric acid group (SO$_4$) or the like or a salt thereof.

Also, a method using a so-called anionic reactive surfactant having an ethylenic unsaturated bond as a polymerizable group in its molecule is proposed. For example, a method using a polyoxyalkylene ether sulfate having an allyl or methallyl group as a polymerizable group is disclosed in JP-A 61-223011. A result obtained by performing emulsion polymerization by using sodium oxyalkanesulfonate using a 3-methyl-3-butenyl group as a polymerizable group, namely, sodium 10-(3-methyl-3-butenyloxy)decane-1-sulfonate is described in Macromolecules, Vol. 32, page 5967 (1999).

However, if each of these reactive surfactants is singly used, stability during polymerization is almost insufficient. In this case, there is the problem that a conventional type emulsifier must be used together. Also, in the case of sodium 10-(3-methyl-3-butenyloxy)decane-1-sulfonate, the production of the compound itself is not easy from the viewpoint of reaction temperature and yield, posing the problem that it is less economical.

It is required for these reactive surfactants to have the characteristics that they are superior in polymerization stability and the mechanical stability and chemical stability of the generated polymer emulsion, have good ability to copolymerize with a monomer and impart high water resistance to a polymer film. Also, it is required for these reactive surfactants to allow the emulsion to have a small particle, to possess a low viscosity and to be free from any environmental problem. Also, in a polymerization method (pre-emulsion method) in which a monomer, water and an emulsifier are emulsified to make a monomer emulsion in advance and then the monomer emulsion is added dropwise, it is also required that the stability of the monomer emulsion is highly stable. No reactive surfactant satisfying all of these requirements has been obtained so far.

DISCLOSURE OF THE INVENTION

It is an object of the present invention to provide a surfactant composition for emulsion polymerization, the composition providing a polymer emulsion which is highly stable during polymerization and ensures that a polymer coating film produced from the polymer emulsion has good properties, and also to provide a method of producing a polymer emulsion by using the surfactant composition.

Namely, the present invention has the object of providing a reactive surfactant composition for emulsion polymerization which fulfills all of the above requirements and a method of producing a polymer emulsion by using the surfactant composition.

The present invention resides in a surfactant for emulsion polymerization, the surfactant comprising at least one compound selected from unsaturated compounds having a pentenyl group to which an alkylene oxide is added and represented by the formula (I), (II) or (VI):

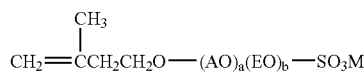

(I)

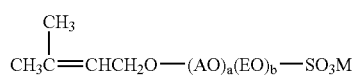

(II)

wherein A represents a straight-chain or branched alkylene group having 3 to 18 carbon atoms or an alkoxymethylethylene group represented by the formula (III) or (IV):

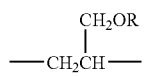

(III)

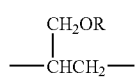

(IV)

wherein R represents a straight-chain or branched alkyl group having 4 to 18 carbon atoms, EO represents an oxyethylene group, a denotes a number of 0 to 50, b denotes a number of 0 to 200 wherein a and b are not 0 at the same time and M represents a cation, provided that the -(AO)— groups a in number [-(AO)$_a$—] and the -(EO)— groups b in number [-(EO)$_b$—] may be connected either in a block sequence or in a random sequence wherein in the case of the block sequence, the order of arrangement of the (AO)$_a$ block and the (EO)$_b$ block may be optional and the -(AO)— groups a in number may be the same as or different from one another;

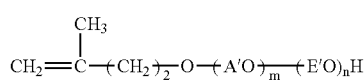

(VI)

wherein A'O represents an oxyalkylene group having 3 to 18 carbon atoms, E'O represents an oxyethylene group, m denotes a number of 0 to 50 showing an average addition mol number of an oxyalkylene group and n denotes a number of 5 to 200 showing an average addition mol number of an oxyethylene group, provided that the -(A'O)— groups m in number [-(A'O)m-] may be the same or different.

Moreover, the present invention provides a surfactant composition for emulsion polymerization, the surfactant composition comprising the aforementioned unsaturated compound and other anionic or nonionic surfactants, a method of producing a polymer emulsion by emulsion-polymerizing a monomer using the above unsaturated compound and a use of the aforementioned unsaturated compound as a surfactant for emulsion polymerization.

DETAILED DESCRIPTION OF THE INVENTION

The unsaturated compound which is a sulfate ester salt represented by the formula (I) or (II) will be explained.

Examples of the straight-chain or branched alkylene group having 3 to 18 carbon atoms which is represented by A in the above formula (I) or (II) include propylene, ethylethylene (butylene), dimethylethylene, butylethylene, octylethylene, decylethylene, dodecylethylene, tetradecylethylene and hexadecylethylene. Examples of the straight-chain or branched alkyl group having 4 to 18 carbon atoms which is represented by R in the formula (III) or (IV) include a butyl group, pentyl group, hexyl group, octyl group, 2-ethylhexyl group, nonyl group, decyl group, undecyl group, dodecyl group, tetradecyl group, hexadecyl group and octadecyl group. a represents the average addition mol number of an oxyalkylene group or an alkoxymethyloxyethylene group and is in a range from 0 to 50 and preferably 0 to 20. When the carbon number of A or R and a fulfill the formula (V) in the case where other surfactants are not used together, the particle diameter of the polymer emulsion can be made smaller and high polymerization stability is obtained and this is therefore particularly preferable.

$$5 \leq (\text{Carbon number of } A \text{ or } R - 2.8) \times a \leq 15 \quad (V)$$

b represents an average addition mol number of an oxyethylene group and is in a range from 0 to 200, preferably 1 to 50 and more preferably 5 to 25. a and b are not 0 at the same time. When a and b are 0 at the same time, an insufficient chemical stability is obtained. The -(AO)— groups a in number and the -(EO)— groups b in number may be connected either in a block sequence or in a random sequence. In the case of the block sequence, the order of arrangement of the -(AO)$_a$ block and the -(EO)$_b$— block may be optional and the -(AO)— groups a in number may be the same as or different from one another. Examples of the cation represented by M include alkali metal ions such as a sodium ion and potassium ion, alkali earth metal ions such as a calcium ion and magnesium ion, ammonium ion and ammonium ion substituted with an alkyl group having 1 to 4 carbon atoms.

It has in particular preferably a block sequence shown in the following formula:

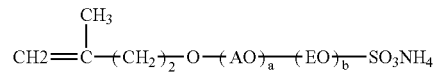

and meets the condition of the formula (V), b being in a range from 5 to 20.

The sulfate ester salt (I) or (II) according to the present invention may be produced using a known method and is obtained, for example, by the following method. Specifically, α-olefin epoxide or alkyl glycidyl ether is added to 3-methyl-3-buten-1-ol in the presence of a catalyst and ethylene oxide is added to the reaction product by a usual method, or ethylene oxide is added to 3-methyl-3-buten-1-ol and then α-olefin epoxide or alkyl glycidyl ether is added to the reaction product, to obtain ether alcohol, which is then sulfated by a sulfating agent, followed by neutralizing by a basic material. Given as examples of the sulfating agent are chlorosulfonic acid, anhydrous sulfuric acid and amidosulfuric acid. When amidosulfuric acid is used, an ammonium salt has been already formed and therefore it is not always necessary to neutralize by a basic material.

Among the sulfate ester salts (I) and (II) in the present invention, the sulfate ester salt(I) is preferable from the viewpoint of the properties of a polymer coating film produced from a produced polymer emulsion.

Next, the unsaturated compound represented by the formula (VI) will be explained.

A'O is an oxyalkylene group having 3 to 18 carbon atoms and is preferably an oxybutylene group or an oxypropylene group. Also, when two or more types of alkylene oxide are added, they may be added by any of random addition and block addition. Also, both addition methods maybe combined. The number m showing the average addition mol number of an oxyalkylene group is 0 to 50 and preferably 0 to 20. The above m is preferably a number satisfying the formula (VII) and more preferably a number satisfying the formula (VIII).

$$2 \leq \{(\text{Carbon number of } A'O-2.8) \times m+2\} \leq 14 \quad (VII)$$

$$4 \leq \{(\text{Carbon number of } A'O-2.8) \times m+2\} \leq 14 \quad (VIII)$$

In the formula (VI), the number n showing the average addition mol number of an oxyethylene group is 5 to 200, preferably 10 to 60 and particularly preferably 10 to 40 from the viewpoint of polymerization stability and the compatibility of the polymer emulsion with a pigment.

The unsaturated compound (VI) may be produced by a known method. Specifically, it may be obtained by adding an alkylene oxide having 3 to 18 carbon atoms and ethylene oxide or by adding only ethylene oxide to 3-methyl-3-buten-1-ol.

Next, the composition of the above unsaturated compound will be explained.

Although other anionic surfactants or nonionic surfactants may be used together in the composition of the surfactant (I) or (II) according to the present invention, the total content of the sulfate ester (I) or (II) is preferably 5 to 100% by weight and more preferably 20 to 100% by weight.

The content of the unsaturated compound (VI) in the composition of the reactive surfactant (VI) according to the present invention is preferably 20 to 100% by weight and more preferably 50 to 100% by weight.

The composition of the reactive surfactant (VI) in the present invention preferably contains an anionic surfactant from the viewpoint of polymerization stability. The anionic surfactant used in the present invention is preferably a reactive anionic surfactant having a radical polymerizable unsaturated bond. For example, sulfosuccinate type reactive surfactants described in JP-A No. 58-203960 and JP-B No. 49-46291 and sulfate ester salt type reactive surfactants described in JP-A No. 62-104802 and JP-A No. 4-53802 may be used.

Also, non-reactive anionic surfactants may be used to the extent that the water resistance of a film produced from the emulsion is not impaired. Examples of the non-reactive anionic surfactant include n-alkyl sulfate ester salts, linear alkylbenzene sulfonate salts, polyoxyethylene alkyl ether sulfate salts and polyoxyethylene alkylphenyl ether sulfate salts.

When using the unsaturated compound (VI) and the anionic surfactant together, the mixing ratio of the unsaturated compound (VI)/the anionic surfactant (ratio by weight) is preferably 85/15 to 30/70 and more preferably 80/20 to 50/50 from the viewpoint of polymerization stability and chemical stability.

Next, the following explanations will be furnished concerning the above unsaturated compound and emulsion polymerization using the composition.

The method of producing a polymer emulsion according to the present invention is a method in which the surfactant composition according to the present invention is used to emulsion-polymerize a vinyl type monomer. The amount of the composition of the surfactant (I) or (II) to be used in the emulsion polymerization is preferably 0.1 to 10% by weight per the total amount of the vinyl monomers.

The composition of the reactive surfactant (VI) in the present invention is used in an amount ranging from 0.1 to 20 parts by weight, preferably 0.2 to 10 parts by weight and particularly preferably 0.5 to 5 parts by weight per 100 parts by weight of the monomers.

Examples of the vinyl type monomer used in the present invention include aromatic vinyl monomers such as styrene, α-methylstyrene and chlorostyrene; (meth)acrylate esters such as methyl(meth)acrylate, ethyl(meth)acrylate, butyl (meth)acrylate and 2-ethylhexyl(meth)acrylate; (meth) acrylic acid; vinyl halides and vinylidene halides such as vinyl chloride, vinyl bromide and vinylidene chloride; vinyl esters such as vinyl acetate and vinyl propionate; nitriles such as acrylonitrile and (meth)acrylonitrile; and conjugated dienes such as butadiene and isoprene. These monomers may be polymerized singly or two or more of these monomers may be copolymerized. The amount of the vinyl type monomer to be used is preferably 40 to 60% by weight based on the total system.

As the initiator used in the emulsion polymerization according to the present invention, any of those used in usual emulsion polymerization may be used.

Examples of the initiator include persulfates such as potassium persulfate and ammonium persulfate, inorganic peroxides such as hydrogen peroxide, organic peroxides such as t-butyl peroxide, cumene hydroperoxide, paramenthane peroxide, t-butyl hydroperoxide, benzoyl peroxide and azo type compounds such as azobisisobutyronitrile, or 2,2'-azobis(2-amidinopropane) dihydrochloride. Persulfates such as potassium persulfate and ammonium persulfate are preferable.

Also, as a polymerization promoter, sodium hydrogensulfite, ferrous ammonium sulfate and the like may be used.

Further, redox type initiators obtained by combining a reducing agent such as sodium sulfite, Rongalite or ascorbic acid with a peroxide compound may be used.

As a method of adding a monomer, a monomer addition method, a batch method or an emulsion addition method may be used. Among these methods, the emulsion addition method(pre-emulsion method) is preferable from the viewpoint of polymerization stability. It is preferable that the addition time is 1 to 8 hours and the aging time is 1 to 5 hours. The polymerization temperature is adjusted by the decomposition temperature of the initiator and is preferably 70 to 80° C. in the case of a persulfate.

When the surfactant composition of the present invention is used as an emulsifier for emulsion polymerization, good polymerization stability and mechanical stability are secured and also, a polymer emulsion ensuring that a polymer film produced therefrom has good water resistance is obtained.

EXAMPLES

In the following examples, all designations of % indicate weight percentage (wt. %), unless otherwise noted.

Examples 1 to 16 relate to inventions using the unsaturated compound represented by the formula (I) or (II). Examples VI-1 to VI-5 relate to inventions using the unsaturated compound represented by the formula (VI).

Examples 1 to 16 and Comparative Examples 1 to 3

A sulfate ester salt produced by the method shown below according to the present invention and a conventional type anionic surfactant were mixed in the ratio shown in Table 1 to prepare surfactant compositions according to the present invention and comparative surfactant compositions. Using this surfactant composition, emulsion polymerization was carried out by the method shown below and the performance of the product was evaluated. The results are shown in Table 1.

<Production Examples of a Sulfate Ester Salt>

Sulfate Ester Salt(A-1)

A reaction vessel equipped with a stirrer, a thermometer, a dropping funnel and a ref lux condenser was charged with 397 g (4.6 mol) of 3-methyl-3-buten-1-ol (manufactured by Tokyo Kasei Kogyo Co., Ltd.) and 3.11 g (0.0576 mol) of powdery sodium methoxide. 236.7 g (1.15 mol) of α-olefin epoxides (AOE X24, manufactured by Daicel Chemical Industries Ltd.) having 12 and 14 carbon atoms was added dropwise to the mixture at 130° C. over 4 hours in a nitrogen atmosphere and the resulting mixture was kept at the same temperature for 12 hours. The ref lux condenser was replaced with a distilling condenser to remove unreacted 3-methyl-3-buten-1-ol under reduced pressure. According to $^1$H-NMR, the average addition mol number of α-olefin epoxide was 1.32. 300 g of the resulting reaction mixture was placed in an autoclave and 477 g of ethylene oxide was added to the reaction mixture in the condition of 140° C. and 0.3 MPa. Next, 87.8 g of a part of the resulting reaction mixture and 12.0 g of amidosulfuric acid were placed in a reaction container equipped with a stirrer and a thermometer and reacted at 120° C. for 90 minutes in a nitrogen atmosphere to sulfate. Unreacted amidosulfuric acid was removed by filtration under pressure to obtain a sulfate ester salt(A-1) represented by the following formula.

(R: mixture of an n-$C_{10}H_{21}$ group and an n-$C_{12}H_{25}$ group)

(Carbon number of A or R−2.8)×a=(11.6−2.8)× 0.8=7.0

The carbon number of R was found by calculating a molecular weight backwards from the following: oxygen of oxirane (%)=7.8.

Sulfate Ester Salt(A-2)

A reaction container equipped with a stirrer, a thermometer, a dropping funnel and a reflux condenser was charged with 310 g (3.6 mol) of 3-methyl-3-buten-1-ol and 1.95 g (0.0361 mol) of powdery sodium methoxide. 223.6 g (1.2 mol) of 2-ethylhexyl glycidyl ether was added dropwise to the mixture at 130° C. over 2.5 hours in a nitrogen atmosphere and the resulting mixture was kept at the same temperature for 5 hours. The reflux condenser was replaced with a distilling condenser to remove unreacted 3-methyl-3-buten-1-ol under reduced pressure. According to $^1$H-NMR, the average addition mol number of 2-ethylhexyl glycidyl ether was 1.53. 284 g of the resulting reaction mixture was placed in an autoclave and 438 g of ethylene oxide was added to the reaction mixture in the condition of 130° C. and 0.4 MPa. Next, 88.4 g of a part of the resulting reaction mixture and 12.6 g of amidosulfuric acid were placed in a reaction container equipped with a stirrer and a thermometer and reacted at 120° C. for 90 minutes in a nitrogen atmosphere to sulfate. Unreacted amidosulfuric acid was removed by filtration under pressure to obtain a sulfate ester salt(A-2) represented by the following formula.

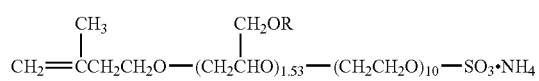

(R: 2-ethylhexyl group)

(Carbon number of A or R−2.8)×a=8.0

Sulfate Ester Salt(A-3)

A reaction container equipped with a stirrer, a thermometer, a dropping funnel and a ref lux condenser was charged with 1801 g (2.1 mol) of 3-methyl-3-buten-1-ol and 3.4 g (0.0629 mol) of powdery sodium methoxide. 273.4 g (2.1 mol) of butyl glycidyl ether was added dropwise to the mixture at 140° C. over 2 hours in a nitrogen atmosphere and the resulting mixture was kept at the same temperature for 7 hours. The reflux condenser was replaced with a distilling condenser to remove unreacted 3-methyl-3-buten-1-ol under reduced pressure. According to $^1$H-NMR, the average addition mol number of butyl glycidyl ether was 1.72. 368 g of the resulting reaction mixture was placed in an autoclave and 558 g of ethylene oxide was added to the reaction mixture in the condition of 140° C. and 0.4 MPa. Next, 82.9 g of a part of the resulting reaction mixture and 11.4 g of amidosulfuric acid were placed in a reaction container equipped with a stirrer and a thermometer and reacted at 120° C. for 90 minutes in a nitrogen atmosphere to sulfate. Unreacted amidosulfuric acid was removed by filtration under pressure to obtain a sulfate ester salt(A-3) represented by the following formula.

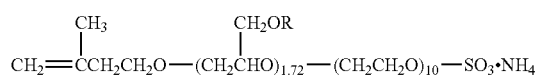

(R: n-$C_4H_9$ group)

(Carbon number of A or R−2.8)×a=2.0

Sulfate Ester Salt(A-4)

An autoclave was charged with 390 g (4.5 mol) of 3-methyl-3-buten-1-ol and 7.58 g (0.1351 mol) of KOH. 1621 g (22.5 mol) of 1,2-epoxybutane was added to the mixture in the condition of 145° C. and 0.3 MPa. In succession, 1985 g (45 mol) of ethylene oxide was added to the resulting mixture in the condition of 150° C. and 0.3 MPa. Next, 261 g, a part of the resulting reaction mixture and 34.7 g of amidosulfuric acid were placed in a reaction container equipped with a stirrer and a thermometer and reacted at 120° C. for 90 minutes in a nitrogen atmosphere to sulfurize. Unreacted amidosulfuric acid was removed by filtration under pressure to obtain a sulfate ester salt(A-4) represented by the following formula.

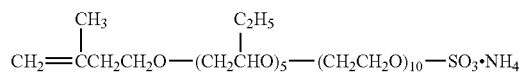

(Carbon number of A or R−2.8)×a=6.0

Sulfate Ester Salt(A-5)

An autoclave was charged with 310 g (3.6 mol) of 3-methyl-2-buten-1-ol (manufactured by Tokyo Kasei Kogyo Co., Ltd.) and 7.26 g (0.134 mol) of powdery sodium methoxide. 1298 g (18 mol) of 1,2-epoxybutane was added to the mixture and in succession, 1586 g (36 mol) of ethylene oxide was added to the resulting mixture in the condition of 130° C. and 0.3 MPa. Next, 84.7 g, a part of the resulting reaction mixture and 9.60 g of amidosulfuric acid were placed in a reaction container equipped with a stirrer and a thermometer and reacted at 120° C. for 90 minutes in a nitrogen atmosphere to sulfurize. Unreacted amidosulfuric acid was removed by filtration under pressure to obtain a sulfate ester salt(A-5) represented by the following formula.

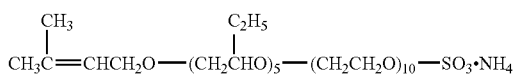

(Carbon number of A or R−2.8)×a=6.0

Sulfate Ester Salt(A-6)

An autoclave was charged with 301 g (3.49 mol) of 3-methyl-3-buten-1-ol and 11.3 g (0.209 mol) of powdery sodium methoxide. 2030 g (34.9 mol) of propylene oxide was added to the mixture and in succession, 1537 g (34.9 mol) of ethylene oxide was added to the resulting mixture in the condition of 130° C. and 0.3 MPa. Next, 81.1 g, a part of the resulting reaction mixture and 8.42 g of amidosulfuric acid were placed in a reaction container equipped with a stirrer and a thermometer and reacted at 120° C. for 90 minutes in a nitrogen atmosphere to sulfate. Unreacted amidosulfuric acid was removed by filtration under pressure to obtain a sulfate ester salt (A-6) represented by the following formula.

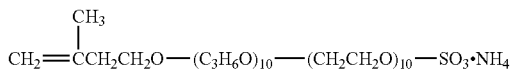

(Carbon number of A or R−2.8)×a=2.0

Sulfate Ester Salt(A-7)

An autoclave was charged with 340 g (3.95 mol) of 3-methyl-3-buten-1-ol and 6.40 g (0.118 mol) of powdery sodium methoxide. 1740 g (39.5 mol) of ethylene oxide was added to the mixture in the condition of 130° C. and 0.3 MPa. Next, 100 g, a part of the resulting reaction mixture and 19.9 g of amidosulfuric acid were placed in a reaction container equipped with a stirrer and a thermometer and reacted at 120° C. for 90 minutes in a nitrogen atmosphere to sulfate. Unreacted amidosulfuric acid was removed by filtration under pressure to obtain a sulfate ester salt(A-7) represented by the following formula.

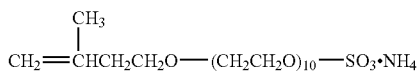

(Carbon number of A or R−2.8)×a=0

Sulfate Ester Salt(A-8)

A reaction container equipped with a stirrer and a thermometer was charged with 76.7 g (0.15 mol) of an ethylene oxide (10 mol) adduct of 3-methyl-3-buten-1-ol which was obtained by the method shown in the production example of the sulfate ester (A-7) and 0.243 g (0.0045 mol) of powdery sodium methoxide. 24.7 g (0.12 mol) of α-olefin epoxides (AOE X24, manufactured by Daicel Chemical Industries Ltd.) having 12 and 14 carbon atoms was added dropwise to the mixture at 140° C. over 1 hour in a nitrogen atmosphere and the resulting mixture was kept at the same temperature for 4 hours. Next, 14.18 g of amidosulfuric acid was added to the aged mixture, which was reacted at 120° C. for 90 minutes in a nitrogen atmosphere to sulfate. Unreacted amidosulfuric acid was removed by filtration under pressure to obtain a sulfate ester salt(A-8) represented by the following formula.

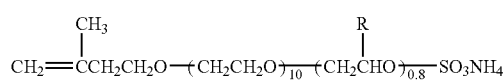

(R: mixture of an n-$C_{10}H_{21}$ group and an n-$C_{12}H_{25}$ group)

(Carbon number of A or R−2.8)×a=(11.6−2.8)× 0.8=7.0

The carbon number of R was found by calculating a molecular weight backwards from the following: oxygen of oxirane (%)=7.8.

Sulfate Ester Salt(A-9)

A reaction container equipped with a stirrer, a thermometer and a dropping funnel was charged with 60.0 g (0.697 mol) of 3-methyl-3-buten-1-ol (manufactured by Tokyo Kasei Kogyo Co., Ltd.), which was then cooled to 10° C. in a nitrogen atmosphere. 1.98 g (0.0140 mol) of boron trifluoride diethyl ether complex (manufactured by Wako Pure Chemical Industries, Ltd.) was added and 251 g (3.48 mol) of 1,2-epoxybutane (butylene oxide) was added dropwise at 7 to 10° C. After the dropping was completed, the mixture was kept at 10° C. for one hour. 6.2 g of an adsorbent, Kyoward 500SH (manufactured by Kyowa Chemical Industry Co., Ltd.) was added to the mixture, which was then stirred at the room temperature for one hour and subjected to filtration under pressure to obtain an 1,2-epoxybutane (5 mol) adduct of 3-methyl-3-buten-1-ol.

An autoclave was charged with 500 g (1.12 mol) of the 1,2-epoxybutane (5 mol) adduct of 3-methyl-3-buten-1-ol obtained in the above method and 1.88 g (0.0336 mol) of KOH and the mixture was dehydrated at 100° C. under 0.004 Mpa. Then, 493 g (11.2 mol) of ethylene oxide was added in the condition of 120° C. and 0.3 Mpa to obtain an 1,2-epoxybutane (5 mol) and ethylene oxide (10 mol) adduct of 3-methyl-3-buten-1-ol.

A four-neck glass flask equipped with a stirrer, a nitrogen-introducing tube and a thermometer was charged with 1.0 mol (887 g) of the resulting compound, 1.05 mol (102 g) of amidosulfuric acid and 0.1 mol (6.0 g) of urea as a side-reaction inhibitor. The mixture was reacted at 105° C. for 2 hours and further at 115° C. for 2 hours with stirring in a nitrogen atmosphere. The reaction mixture was then cooled, followed by filtration under pressure to obtain a sulfate ester salt(A-9) represented by the following formula.

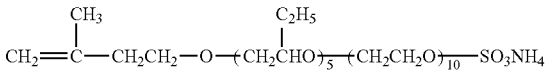

(Carbon number of A or R−2.8)×a=6.0

Sulfate Ester Salt(A-10)

603 g (8.36 mol) of 1,2-epoxybutane was added to 60.0 g (0.697 mol) of 3-methyl-3-buten-1-ol in the presence of 2.97 g (0.0209 mol) of boron trifluoride diethyl ether complex in the same manner as in the production of the sulfate ester (A-9) to obtain an 1,2-epoxybutane (12 mol) adduct. An autoclave was charged with 500 g (0.526 mol) of the resulting compound and 0.885 g (0.0158 mol) of KOH and the mixture was dehydrated at 100° C. under 0.004 MPa. Then, 463 g (10.5 mol) of ethylene oxide was added to the dehydrated mixture under the condition of 120° C. and 0.3 MPa to obtain a BO (12 mol) and EO (20 mol) adduct of 3-methyl-3-buten-1-ol.

0.6 mol (58.3 g) of amidosulfuric acid was reacted with 0.5 mol (916 g) of the resulting compound in the presence of 0.05 mol (3.0 g) of urea in the same manner as in the production of the sulfate ester (A-9). After the reaction was completed, the reaction mixture was cooled, followed by filtration under pressure to obtain a sulfate ester salt(A-10).

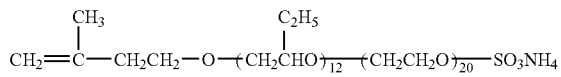

(Carbon number of $A$ or $R$–2.8)×$a$=14.4

Sulfate Ester Salt(A-11)

502 g (6.97 mol) of 1,2-epoxybutane was added to 60.0 g (0.697 mol) of 3-methyl-3-buten-1-ol in the presence of 2.97 g (0.0209 mol) of boron trifluoride diethyl ether complex in the same manner as in the production of the sulfate ester salt (A-9) to obtain an 1,2-epoxybutane (10 mol) adduct. An autoclave was charged with 500 g (0.620 mol) of the resulting compound and 1.04 g (0.0186 mol) of KOH and the mixture was dehydrated at 100° C. under 0.004 MPa. Then, 410 g (7.3 mol) of ethylene oxide was added to the dehydrated mixture under the condition of 120° C. and 0.3 MPa to obtain a BO (10 mol) and EO (20 mol) adduct of 3-methyl-3-buten-1-ol.

0.6 mol (58.3 g) of amidosulfuric acid was reacted with 0.5 mol (733 g) of the resulting compound in the presence of 0.05 mol (3.0 g) of urea in the same manner as in the production of the sulfate ester salt(A-9). After the reaction was completed, the reaction mixture was cooled, followed by filtration under pressure to obtain a sulfate ester salt(A-11)

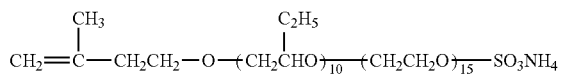

(Carbon number of $A$ or $R$–2.8)×$a$=12.0

The sulfate ester salts obtained above were used in the following polymerization reaction.

Examples VI-1 to VI-5 and Comparative Examples VI-1 to VI-8

The following compounds (a-1) to (a-3) as the unsaturated compound (VI), the following compounds (b-1) to (b-5) as comparative reactive nonionic surfactants and the following compounds (c-1) and (c-2) as anionic surfactants were used and formulated in the proportions shown in Table VI-1 to prepare reactive surfactant compositions according to the present invention and comparative reactive surfactant compositions. Using these reactive surfactant compositions, emulsion polymerization was carried out using the following method to evaluate the performance of each product. The results are shown in Table VI-1.

(a-1):

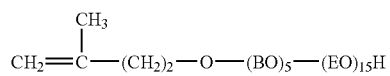

{(Carbon number of $AO$–2.8)×$m$+2}=8

(a-2):

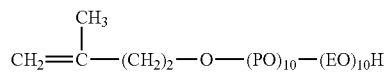

{(Carbon number of $AO$–2.8)×$m$+2}=4

(a-3):

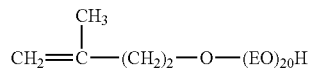

{(Carbon number of $AO$–2.8)×$m$+2}=2

<Synthetic Example of a Reactive Nonionic Surfactant VI>

Nonionic Surfactant(a-1)

An autoclave was charged with 390 g (4.5 mol) of 3-methyl-3-buten-1-ol and 7.58 g (0.1351 mol) of KOH, to which were then added 1621 g (22.5 mol) of 1,2-epoxybutane in the condition of 145° C. of 0.3 MPa and then 2973 g (67.5 mol) of ethylene oxide in the condition of 150° C. and 0.3 MPa. The resulting product was cooled and neutralized using 8.1 g (0.1351 mol) of acetic acid to obtain a nonionic surfactant (a-1).

Nonionic Surfactant (a-2)

An autoclave was charged with 301 g (3.49 mol) of 3-methyl-3-buten-1-ol and 11.3 g (0.209 mol) of powdery sodium methoxide, to which were then added 2030 g (34.9 mol) of propylene oxide and then 1537 g (34.9 mol) of ethylene oxide in the condition of 130° C. and 0.3 MPa. The resulting product was cooled and neutralized using 12.5 g. (0.21 mol) of acetic acid to obtain a nonionic surfactant (a-2).

Nonionic Surfactant (a-3)

An autoclave was charged with 340 g (3.95 mol) of 3-methyl-3-buten-1-ol and 6.40 g (0.118 mol) of powdery sodium methoxide, to which was then added 3480 g (79 mol) of ethylene oxide in the condition of 130° C. and 0.3 MPa. Then, the resulting product was cooled and neutralized using 7.1 g (0.118 mol) of acetic acid to obtain a nonionic surfactant (a-3).

Comparative Nonionic Surfactant (b-1)

An autoclave was charged with 290.4 g (5.0 mol) of allyl alcohol and 8.1 g (0.15 mol) of powdery sodium methoxide, to which was then added 7709 g (175 mol) of ethylene oxide in the condition of 130° C. and 0.3 MPa. Then, the resulting product was cooled and neutralized using 9.0 g (0.15 mol) of acetic acid to obtain a comparative nonionic surfactant (b-1).

Comparative Nonionic Surfactant (b-2)

An autoclave was charged with 290.4 g (5.0 mol) of allyl alcohol and 10.8 g (0.2 mol) of powdery sodium methoxide, to which were then added 3606 g (50 mol) of 1,2-epoxybutane in the condition of 130° C. of 0.3 MPa and then 7709 g (175 mol) of ethylene oxide in the condition of 130° C. and 0.3 MPa. The resulting reaction product was cooled and neutralized using 12.0 g (0.20 mol) of acetic acid to obtain a comparative nonionic surfactant (b-2).

Comparative Nonionic Surfactant (b-3)

An autoclave was charged with 288.4 g (4.0 mol) of 2-methyl-2-buten-1-ol and 6.48 g (0.12 mol) of powdery sodium methoxide, to which was then added 3524 g (80 mol) of ethylene oxide in the condition of 130° C. and 0.3 MPa. The resulting reaction product was cooled and neutralized using 7.2 g (0.12 mol) of acetic acid to obtain a comparative nonionic surfactant (b-3).

(b-1): $CH_2=CH-CH_2-O-(EO)_{35}H$
(b-2): $CH_2=CH-CH_2-O-(BO)_{10}-(EO)_{35}H$
(b-3):

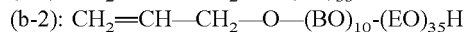

(b-4): Compound disclosed in JP-A No. 62-104802

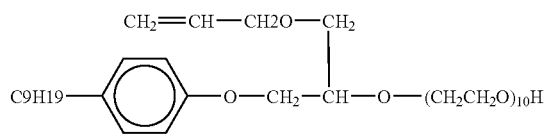

(b-5): Nonylphenol.ethylene oxide (35 mol) adduct
(c-1): Compound disclosed in JP-A No. 58-203960

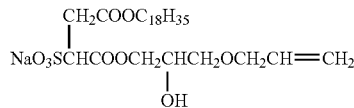

(c-2): Na salt of linear alkyl(12 carbon atoms)benzenesulfonic acid

<Emulsion Polymerization Method Using the Unsaturated Compounds (I) and (II)>

5.5 g of a surfactant composition and 0.28 g of potassium persulfate were dissolved in 117.8 g of deionized water weighed in a beaker. 2.8 g of acrylic acid, 136.1 g of butyl acrylate and 136.1 g of methylmethacrylate were added to the mixture, which was then emulsified using a homomixer at 5000 r/min for 10 minutes, to obtain a monomer emulsion. A separable flask was charged with 137.9 g of deionized water, 0.25 g of potassium persulfate and 36.2 g of the above monomer emulsion and the mixture was stirred for 15 minutes in a nitrogen stream. Next, the mixture was stirred in a water bath under a nitrogen stream to allow a rise in temperature until the internal temperature in the flask became 80° C. After the temperature rose, 326.4 g of the above monomer emulsion was added dropwise over 3 hours from a dropping funnel. After the resulting mixture was aged for one hour, it was cooled to ambient temperature to obtain a polymer emulsion. The temperature in the flask was kept at 80±2° C. during dropping and aging. Also, in the case where the monomer emulsion to be dropped was separated in the dropping funnel, a small stirrer was placed in the dropping funnel to keep the emulsion even.

<Emulsion Polymerization Method Using the Unsaturated Compound (VI)>

2.8 g of acrylic acid, 136.1 g of butyl acrylate and 136.1 g of methylmethacrylate were mixed to prepare a monomer mixture. 5.5 g of a reactive surfactant composition and 0.275 g of potassium persulfate were dissolved in 117.9 g of deionized water. The above monomer mixture was mixed with the solution, which was then emulsified using a homomixer at 5000 r/min for 10 minutes, to obtain an even monomer emulsion.

A separable flask was charged with 135.4 g of deionized water, 0.25 g of potassium persulfate and 36.3 g of the above monomer emulsion and the mixture was stirred for 15 minutes in a nitrogen stream. Next, the mixture was stirred in a water bath kept at 80° C. under a nitrogen stream to raise the temperature of the mixture. The mixture was initially polymerized for 30 minutes and 326.3 g of the above monomer emulsion was added dropwise over 3 hours. The temperature in the flask was kept at 80±2° C. during dropping. The mixture was kept at 80° C. for one hour after the dropping was finished to age. After the aging was finished, the aged mixture was cooled to the room temperature to obtain a polymer emulsion.

<Method for the Evaluation of Performance>

(1) Polymerization Stability

The polymer emulsion was subjected to filtration using a 200 mesh stainless screen and the coagula stuck to a reactor wall, a stirrer blade and the like after the polymerization were also collected and filtered in the same manner. The obtained both residues were washed with water, dried at 105° C. under 26.6 kPa and weighed to find the amount of the coagula. The polymerization stability was expressed by the weight percentage of the coagula based on the total amount of the used monomer.

(2) Mechanical Stability 50 g of the polymer emulsion neutralized by aqueous 25% ammonia was placed in a Malon stability tester, which was rotated for 5 minutes in the condition of 10 kgf and 1000 r/min. The generated coagulum was filtered using a 200 mesh stainless screen and the residue was washed with water, dried at 105° C. under 26.6 kPa for 2 hours and weighed to express the percentage of the dried residue based on the polymer.

(3) Average Particle Diameter

A particle-diameter measuring instrument by a dynamic light scattering method, COULTER® N4 Plus manufactured by BECKMAN COULTER, Inc. was used to measure the average particle diameter of the polymer particle in the polymer emulsion neutralized by aqueous 25% ammonia.

(4) Viscosity

A Brookfield viscometer was used to measure the viscosity of the polymer emulsion neutralized by aqueous 25% ammonia at 25° C. at a revolution of 12 r/min.

(5) Chemical Stability

The polymer emulsion after neutralized was diluted with deionized water to bring the polymer concentration to 3% and subjected to titration using an aqueous 1 molL$^{-1}$ calcium chloride solution to measure a concentration of calcium chloride at which a coagulate arose.

(6) Water Resistance of the Polymer Film

The polymer emulsion neutralized by aqueous 25% ammonia was applied to a slide glass plate and dried at 60° C. to produce a polymer film. The polymer film was immersed in 25° C. deionized water to evaluate the condition of whiting according to the following standard.

⊚: Not whited at all after one hour passed
○: Slightly whited after one hour passed
Δ: Whited in 10 to 30 minutes
X: Whited immediately The results of the compounds (I) and (II) are described in Table 1 and the results of the compound (VI) are described in Table 2.

B-1: Mixture of

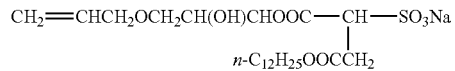

and

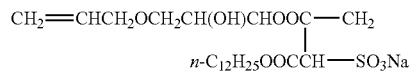

(Compounds synthesized by the method described in JP-A No. 58-203960)

B-2:

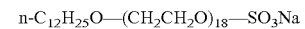

B-3:

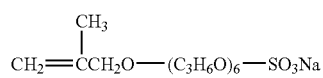

(Compound synthesized by the method described in JP-A No. 61-223011)

TABLE 1

| | Surfactant composition(%) | | | | Average | | Water resistance |
| | Sulfate ester salt according to the present invention | (Carbon number of A or R − 2.8) × a | Conventional type anionic surfactant | Polymerization stability (%) | Mechanical stability (%) | particle diameter (nm) | Viscosity (mPa · s) | of the polymer film |
|---|---|---|---|---|---|---|---|---|
| Example | | | | | | | | |
| 1 | A-1 (100) | 11.6 | | 0.15 | 0.19 | 178 | 690 | ⊚ |
| 2 | A-2 (100) | 8.0 | | 0.28 | 0.37 | 152 | 2060 | ⊚ |
| 3 | A-3 (100) | 2.0 | | 0.23 | 0.01 | 408 | 37 | ○ |
| 4 | A-4 (100) | 6.0 | | 0.22 | 0.16 | 244 | 153 | ⊚ |
| 5 | A-5 (100) | 6.0 | | 0.17 | 0.03 | 371 | 54 | ○ |
| 6 | A-6 (100) | 2.0 | | 0.10 | 0.01 | 469 | 38 | ○ |
| 7 | A-7 (100) | 0 | | 0.29 | 0.01 | 588 | 1.5 | ○ |
| 8 | A-8 (100) | 7.0 | | 0.26 | 0.01 | 306 | 9.3 | ⊚ |
| 9 | A-6 (80) A-1 (20) | 2.0 11.6 | | 0.19 | 0.11 | 193 | 540 | ⊚ |
| 10 | A-7 (80) A-1 (20) | 0 11.6 | | 0.17 | 0.01 | 281 | 100 | ⊚ |
| 11 | A-6 (80) | 2.0 | B-1 (20) | 0.16 | 0.09 | 200 | 453 | ○ |
| 12 | A-6 (20) | 2.0 | B-1 (80) | 0.13 | 0.11 | 154 | 2350 | ○ |
| 13 | A-9 (100) | 6.0 | | 0.23 | 0.04 | 240 | 290 | ⊚ |
| 14 | A-10 (100) | 14.4 | | 0.2 | 0.3 | 180 | 2030 | ⊚ |
| 15 | A-9 (20) A-10 (80) | 6.0 14.4 | | 0.19 | 0.02 | 174 | 2470 | ⊚ ⊚ |
| 16 | A-11 (100) | 12.0 | | 0.17 | 0.16 | 184 | 1610 | ⊚ |
| Comparative example | | | | | | | | |
| 1 | | | B-1 (100) | 0.62 | 0.07 | 164 | 1518 | ○ |
| 2 | | | B-2 (100) | 0.32 | 1.2 | 163 | 1200 | X |
| 3 | | | B-3 (100) | 0.41 | 0.05 | 538 | 5.2 | Δ |

*1 Conventional type anionic surfactant

TABLE 2

| | Reactive surfactant composition | | | | | | | | Water |
| | (A) Reactive nonionic surfactant | (B) anion surfactant | (A)/(B) weight ratio | Polymerization stability (%) | mechanical stability (%) | Average particle diameter (nm) | Viscosity (mPa · s) | Chemical stability (mmoIL$^{-1}$) | resistance of the polymer film |
|---|---|---|---|---|---|---|---|---|---|
| Example | | | | | | | | | |
| VI-1 | (a-1) | (c-1) | 80/20 | 0.18 | 0.09 | 260 | 230 | >1500 | ⊚ |
| VI-2 | (a-1) | (c-1) | 50/50 | 0.16 | 0.05 | 195 | 1200 | 720 | ⊚ |
| VI-3 | (a-2) | (c-1) | 60/40 | 0.23 | 0.13 | 240 | 260 | 1150 | ○ |
| VI-4 | (a-3) | (c-1) | 80/20 | 0.25 | 0.12 | 250 | 230 | >1500 | ○ |
| VI-5 | (a-3) | (c-1) | 67/33 | 0.21 | 0.11 | 235 | 260 | 1430 | ○ |
| Comparative Example | | | | | | | | | |
| VI-1 | None | (c-1) | — | 0.25 | 0.04 | 165 | 1030 | 20 | ⊚ |
| VI-2 | (b-1) | (c-1) | 80/20 | 2.04 | 0.22 | 270 | 210 | >1500 | Δ |
| VI-3 | (b-1) | (c-1) | 50/50 | 0.58 | 0.39 | 260 | 280 | 540 | Δ |
| VI-4 | (b-1) | (c-2) | 80/20 | 1.05 | 0.45 | 190 | 1500 | >1500 | Δ |
| VI-5 | (b-2) | (c-1) | 80/20 | 0.72 | 0.33 | 265 | 230 | >1500 | Δ |
| VI-6 | (b-3) | (c-1) | 80/20 | 0.94 | 0.28 | 270 | 240 | >1500 | Δ |
| VI-7 | (b-4) | (c-1) | 80/20 | 4.33 | 0.36 | 230 | 270 | >1500 | Δ |
| VI-8 | (b-5) | (c-1) | 80/20 | 0.48 | 0.24 | 225 | 260 | >1500 | Δ |

What is claimed is:

1. A surfactant for emulsion polymerization, comprising at least one compound selected from the group consisting of unsaturated compounds having a pentenyl group to which an alkylene oxide is added and represented by the formula (I), (II) or (VI):

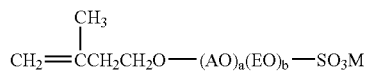
(I)

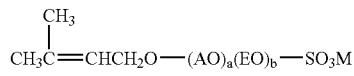
(II)

wherein A represents a straight-chain or branched alkylene group having 3 to 18 carbon atoms or an alkoxymethylethylene group represented by the formula (III) or (IV):

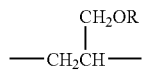
(III)

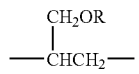
(IV)

wherein R represents a straight-chain or branched alkyl group having 4 to 18 carbon atoms, EO represents an oxyethylene group, a denotes a number of 0 to 50, b denotes a number of 0 to 200, a and b are not 0 at the same time and M represents a cation, provided that the -(AO)— groups a in number and the -(EO)— groups b in number may be connected either in a block sequence or in a random sequence; in the case of the block sequence, the order of arrangement of the -(AO)— block and the -(EO)— block may be optional and the -(AO)— groups a in number may be the same as or different from one another

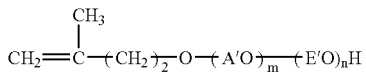
(VI)

wherein A'O represents butyleneoxide, E'O represents an oxyethylene group, m is a number meeting the formula (VIII):

$$4 \leq \{(\text{Carbon number of A'O} - 2.8) \times m + 2\} \leq 14 \quad (VIII)$$

showing an average addition mol number of an oxyalkylene group and n denotes a number of 5 to 200 showing an average addition mol number of an oxyethylene group, provided that the -(A'O)— groups m in number [-(A'O)m-] may be the same as or different from one another.

2. The surfactant for emulsion polymerization as claimed in claim 1, comprising at least one selected from the group consisting of unsaturated compounds represented by the formula (I) or (II).

3. A method of producing a polymer emulsion by emulsion-polymerizing a monomer using the unsaturated compound as claimed in claim 2.

4. A surfactant composition for emulsion polymerization, comprising the unsaturated compound as claimed in claim 1 and another anionic or nonionic surfactant.

5. A method of producing a polymer emulsion by emulsion-polymerizing a monomer using the unsaturated compound as claimed in claim 1.

* * * * *